United States Patent [19]

Gray et al.

[11] Patent Number: 4,483,896
[45] Date of Patent: Nov. 20, 1984

[54] CARPET SEAMING TAPE WITH SEPARATE HEATING CIRCUITS

[75] Inventors: James B. Gray, San Diego; Peter L. Jorgenson, El Cajon; Robert A. Joyce, La Mesa, all of Calif.

[73] Assignee: Seam Team, El Cajon, Calif.

[21] Appl. No.: 464,132

[22] Filed: Feb. 4, 1983

[51] Int. Cl.³ .............................................. B32B 3/00
[52] U.S. Cl. ..................... 428/200; 428/62; 428/113; 428/256; 428/349; 428/913
[58] Field of Search ............... 428/62, 113, 200, 256, 428/349, 913

[56] References Cited

U.S. PATENT DOCUMENTS

| | | | |
|---|---|---|---|
| 3,523,176 | 8/1970 | Hill | 219/245 |
| 3,619,333 | 11/1971 | Mender | 156/583 |
| 3,660,191 | 5/1972 | Shimota et al. | 156/152 |
| 3,972,768 | 8/1976 | Hill | 156/545 |
| 4,123,305 | 10/1978 | Krzeszowski . | |

FOREIGN PATENT DOCUMENTS 1282418  7/1972  United Kingdom ................ 428/62

*Primary Examiner*—Marion E. McCamish
*Attorney, Agent, or Firm*—Brown & Martin

[57] ABSTRACT

A carpet seaming apparatus includes an elongated bonding tape having an electrical resistance circuit with contacts at the edge of the tape mounted on the face thereof with a hot melt adhesive in the form of elongated beads running the length of the tape that melts in response to electrical current in the resistive conductors. A tool having spaced apart electrical contacts for engaging the contacts adjacent the edges of the tape inducing an electrical current therein for heating and melting the hot melt adhesive.

19 Claims, 5 Drawing Figures

CARPET SEAMING TAPE WITH SEPARATE HEATING CIRCUITS

BACKGROUND OF THE INVENTION

The present invention relates to carpet seaming and pertains particularly to improved apparatus and methods for seaming carpets.

In recent years, development in carpet installation implements and methods have not progressed as rapidly as developments in carpet materials and design.

When jute materials and shag carpet designs dominated the marketplace minimum installation skills were required. Carpet textures and designs permitted crude installation implements and a multitude of installation errors with, however, satisfactory installation results.

Shag carpet domination of the marketplace ended approximately six (6) to eight (8) years ago. The carpet industry has made a dramatic shift away from forgiving shag carpet designs to the more precise stitch patterns of Saxony and velour velvet designs. Jute is no longer the industry's predominate material for carpet and backing materials, industry economics and world trade policies have changed this. Developments such as "Action Back", "Typar", "Unitary Back" and others, are examples of these changes. The polyethylene fibers in the new backing materials are very sensitive to any excess heat.

Today's fine designs and synthetic materials are anything but forgiving to the installer. The installer needs considerable skill in carpet seaming to provide results that are satisfactory to the consumer.

Excessive heat from the installers hot iron passes through the backing material and creates a distortion on the carpet surface in the form of a shadow effect or peaked seam.

It is therefore desirable that improvements be available in the methods and apparatus for seaming carpet.

SUMMARY AND OBJECTS OF THE INVENTION

It is therefore the primary object of the present invention to provide improved apparatus and methods for seaming carpets.

In accordance with the primary aspect of the present invention, a carpet seaming apparatus includes a seaming tape having a resistance conductive circuit disposed thereon with a hot melt over the resistance conductors and means for applying a current through the conductors for heating the hot melt.

BRIEF DESCRIPTION OF THE DRAWINGS

The above and other objects and advantages of the present invention will become apparent from the following description when read in conjunction with the drawings wherein.

DETAILED DESCRIPTION OF A PREFERRED EMBODIMENT

Figure 1:
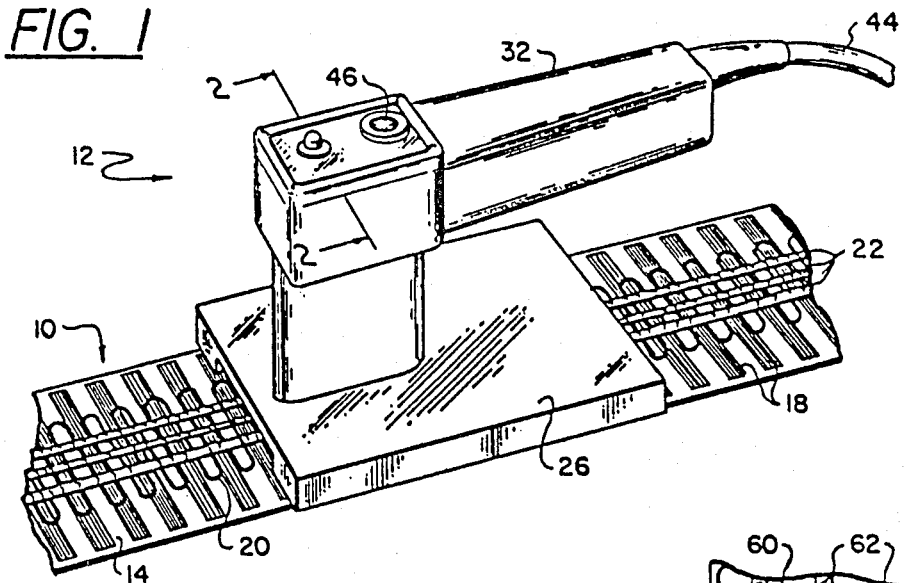
FIG. 1 is a perspective view of a preferred embodiment of the invention as illustrated in position for use.

Turning to FIG. 1 of the drawings, there is illustrated a seaming tape in accordance with the present invention designated generally by the numeral 10 and an electrical activating device designated generally by the numeral 12 for activating the electric seaming tape.

The seaming tape consists of an elongated flat flexible strip of tape 14 which in the preferred embodiment is a heavy grade of paper having a backing 16 of aluminum foil or the like for acting as a heat shield. The tape is of the size and general structure of a conventional seaming tape and includes, placed on the top surface thereof, a series or continuous series of electrical heating circuits which in this embodiment consists essentially of a plurality of transversely extending conductive strips 18, each of which in the preferred embodiment consists of a conductive ink that is simply printed on the upper surface of the tape 14. The pattern of the electrical circuits as defined by the ink printing may take any number of forms, but preferably consists of elongated strips running from closely adjacent one edge of the tape to the closely adjacent the opposite edge.

The ink or conductive strips may as previously explained take any number of forms but preferably extend across closely adjacent in a pattern that provides maximum uniform heating of the hot melt as will be subsequently explained. This may take the form of a plurality of closely adjacent straight narrow strips or curved strips, taking any number of forms.

Placed directly on top of the tape and over the conductive circuit is a reinforcing scrim 20 which in the usual construction takes the form of a web or a serpentine form of reinforcing cord such as a fiberglass or other suitable reinforcing cord. This may be attached to the backing by the hot melt or by other adhesive. A plurality of beads of hot melt adhesive 22 extend along the length of the tape from and extend in parallel rows from closely adjacent one side to closely adjacent the opposite side. The usual tape has on the order of about 8 rows or beads of such hot melt.

In the present invention a foamed hot melt is preferably used. Due to the unique construction of the heating apparatus, a foamed hot melt has been found to be more economical in that it melts more quickly and provides a more complete bond with less bul or volume of the hot melt adhesive. The present heating apparatus enables the use of a foamed hot melt whereas the prior hot iron method of seaming does not permit the use of a foamed hot melt. The foamed hot melt has a tendency to vaporize when a hot iron is applied directly to the hot melt as in the prior art devices and methods of tape seaming.

The tape thus provides its own heating elements built directly into the tape such that when the heating elements are activated, the hot melt melts to its tacky state and is thus ready for application to the backing of a carpet or the like.

Figure 2:
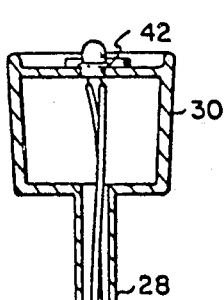
FIG. 2 is a section view taken generally on line 2—2 of FIG. 1.

A suitable activating apparatus 12 (FIG. 2) comprises a generally rectangular shoe or foot 26 secured to a pedestal member 28 on which is formed or secured a head 30 having a handle 32 extending backward therefrom. An electrical circuit is built within the activating apparatus and in the illustrated embodiment comprises a pair of spaced apart conductor shoes 34 and 36 extending downward from the bottom of foot 26 and spaced apart sufficient to engage the side edges of the tape in contact with the ends of the conductive strips of the resistive conducting elements. Each of the conductive shoes 34 and 36 is connected by an electrical conductor 38 and 40 to a switch 42 in the head 30 which may be a push button switch or the like and through a cord 44 to a source of electrical power. An indicator light 46 on the head 30 may be provided for showing activation of the circuit. In the preferred form, the activating apparatus uses a low voltage source of electrical current such as 12 or 24 volts with 24 volts being the preferred due to the efficiency thereof. This low voltage has been found by tests to be more than adequate and ensures safety of the device. A step down transformer may be provided for stepping the voltage down to the desired 12 or 24 volts from a standard 110 or 220 volt system.

Figure 3:
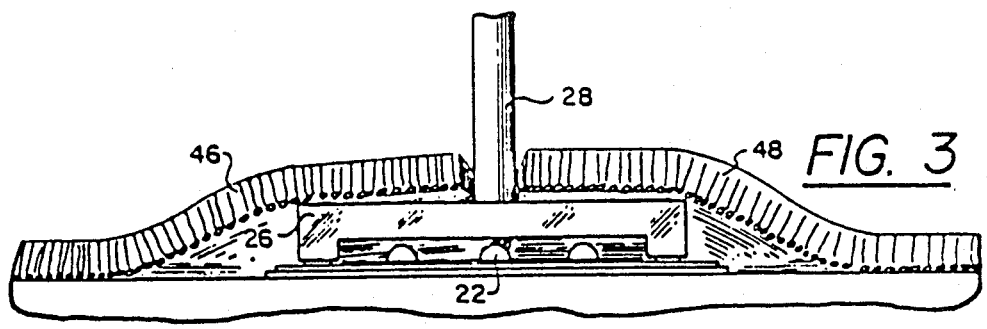
FIG. 3 is a front elevation view of a portion of the apparatus of FIG. 1 shown in position for use.

In operation, the strip of tape is placed under the edges of a pair of adjacent carpet segments or strips 46 and 48 with the base or foot 26 of the activating device placed over the tape to contact the conductors or contacts 34 and 36 with the tape conductors adjacent the edges of the tape (FIG. 3). The pedestal 28 extends upward between the adjacent edges of the carpet sections 46 and 48 with the handle and head thereof above the carpet such that the circuit can be completed by activating switch 42. This applies a voltage across the conductor terminals 34 and 36 by way of the conductive strips 18, thus generating a heat by means of the electrical current in the strips 18 causing the beads of hot melt to melt to a tacky state as the shoe 26 moves along the tape. The carpet behing the activating tool is then pressed down and with the edges together on top of the tape and permitted to bond.

The melting temperature of the tape is preferably on the order of about 240° to 250° Fahrenheit (about 115° to 121° Centrigrade) for the foamed hot melt. The same melt unfoamed would melt in the neighborhood of about 327° Fahrenheit (about 164° C.). Also, the foamed melt permits the use of approximately half of the hot melt as would be required for nonfoamed hot melt.

The resistance circuit on the tape is preferably on the order of around 24 to 30 ohms in resistance for a 24 V system. This would be approximately in the range of about 8 to 10 ohms for a 12 V system.

Figure 4:
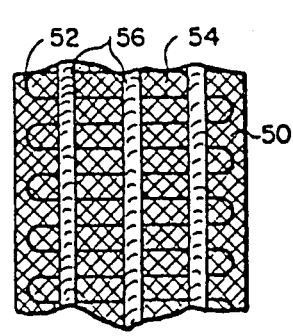
FIG. 4 is a top plan view of an alternate form of seaming tape.

Referring now to FIG. 4 of the drawings, an alternate construction of the tape is shown wherein a tape strip or backing 50 as in the previous embodiment has an electrical conductive material in this instance in the form of a nonwoven carbon fiber matting 52 formed of carbon fibers. This provides the electrical resistance conductive network on top of which is placed a scrim 54 and on top of that is placed a plurality of beads 56 of a foamed adhesive. The carbon matting 52 may also be coated with a metal such as nickel or the like, which may be flame sprayed on to the carbon fibers. Such carbon fabric or material is available from International Paper Company and is normally used as a structural reinforcement for plastic injection molded products.

Figure 5:
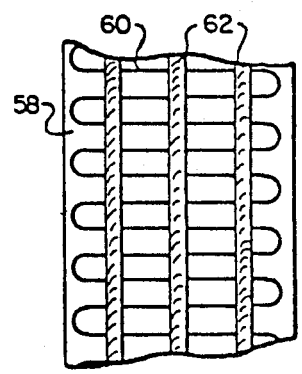
FIG. 5 is a view like FIG. 4 of a still further embodiment of a seaming tape.

Turning to FIG. 5, a still further embodiment is illustrated wherein a backing sheet or strip 58 is provided with a scrim 60 which in this instance consists of reinforcing scrim of fiberglass, jute or a similar cord of materials which is impregnated with a conductive powder or material such as carbon, metal powder or a conductive ink. In this instance, the scrim cords must extend over to the edges closely adjacent to the side edges of the tape 58 to enable engagement thereof by the conductive shoes 34 and 36 of the activating apparatus. Beads of foamed hot melt adhesive 62 are placed over the scrim and extend the length of the tape.

While we have illustrated and described our invention by means of specific embodiments, it is to be understood that numerous changes and modifications may be made therein without departing from the spirit and scope of the invention as defined in the appended claims.

We claim:

1. An electrically activated seaming tape comprising:
    an elongated thin flat flexible backing strip;
    a plurality of beads of heat sensitive adhesive mounted on and extending along the length of said tape; and
    a plurality of electrical resistance heating circuits defined by a plurality of conductors mounted on and extending transverse to said strip and terminating with electrical contact means adjacent to the side edges of said backing strip for selectively applying a source of electrical voltage in sequence to said circuits along said strip for heating said adhesive.

2. The seaming tape of claim 1 wherein said conductors comprise an ink printed on the surface of said backing strip.

3. The seaming tape of claim 1 wherein said conductors are conductive fibers.

4. The seaming tape of claim 3 wherein said conductive fibers are carbon fibers.

5. The seaming tape of claim 4 wherein said carbon fibers are metal coated.

6. The seaming tape of claim 5 wherein said carbon fibers are in the form of a nonwoven matting.

7. The seaming tape of claim 4 wherein said conductive fibers are in the form of a nonwoven matting.

8. The seaming tape of claim 1 wherein said adhesive is a foamed hot melt.

9. The seaming tape of claim 8 wherein said adhesive has a melting temperature of from about 240° to 250° Fahrenheit.

10. The seaming tape of claim 1 including a reinforcing scrim mounted on said backing strip, and said scrim defines said conductors.

11. The seaming tape of claim 1 which said heating circuits are longitudinally spaced.

12. An electrically activated bonding tape, said tape comprising:
    an elongated thin flat flexible substrate having parallel side edges;
    a plurality of beads of hot melt adhesive mounted on and extending the length of said substrate; and
    electrical conductive means defining a continuous series of electrical heating circuits extending generally transversely to said flexible substrate between said parallel edges and including electrical contact means adjacent the side edges of said tape for selectively applying a source of electrical voltage to said electrical heating circuits in sequence along said substrate for heating said adhesive.

13. The bonding tape of claim 12 wherein said substrate comprises reinforced tape having a backing and a face on the opposite side of said tape from said backing and on which said adhesive is mounted.

14. The bonding tape of claim 13 wherein said conductive means comprises patterns of conductive ink printed on the face of said tape.

15. The bonding tape of claim 13 including a reinforcing scrim on said tape.

16. The bonding tape of claim 15 wherein said scrim includes means defining said conductive means.

17. The bonding tape of claim 15 wherein said electrical conductive means is defined by conductive fibers.

18. The bonding tape of claim 17 wherein said conductive fibers are carbon.

19. The seaming tape of claim 12 wherein said heating circuits are longitudinally spaced.

* * * * *